United States Patent [19]
Eldada

[11] Patent Number: 6,091,870
[45] Date of Patent: Jul. 18, 2000

[54] WAVELENGTH DIVISION MULTIPLEXER/ DEMULTIPLEXER OPTICAL DEVICE

[75] Inventor: Louay Eldada, Randolph, N.J.

[73] Assignee: Corning Incorporated, Corning, N.Y.

[21] Appl. No.: 09/027,026

[22] Filed: Feb. 20, 1998

[51] Int. Cl.[7] .................................................. G02B 6/26
[52] U.S. Cl. .............................. 385/37; 385/24; 385/14; 385/131
[58] Field of Search .................................. 385/129–132, 385/14, 37, 46, 16, 10, 24

[56] References Cited

U.S. PATENT DOCUMENTS

| | | | |
|---|---|---|---|
| 4,737,007 | 4/1988 | Alferness et al. | 350/96.19 |
| 5,195,161 | 3/1993 | Adar et al. | 385/129 |
| 5,574,807 | 11/1996 | Snitzer | 385/24 |
| 5,636,309 | 6/1997 | Henry et al. | 385/129 |
| 5,841,928 | 11/1998 | Maxwell et al. | 385/129 |
| 5,915,051 | 6/1999 | Damask et al. | 385/16 |

FOREIGN PATENT DOCUMENTS

| | | | |
|---|---|---|---|
| 195 09 447 A 1 | 9/1995 | Germany | H04J 14/02 |
| 195 22 591 A 1 | 1/1997 | Germany | H04J 14/02 |
| 196 47 789 A 1 | 5/1998 | Germany | G02B 6/124 |

OTHER PUBLICATIONS

Sergei S. Orlov, Ammon Yariv, and Scott Van Essen, "Coupled–mode analysis of fiber–optic add–drop filters for dense wavelength–division multiplexing", May 15, 1997, Optics Letters, vol. 22, No. 10, pp. 688–690.

Ingolf Baumann, Joachim Seifert, Walter Nowak, and Michael Sauer, Member, IEEE, "Compact All–Fiber Add–Drip–Multiplexer Using Fiber Bragg Gratings", Oct. 1996, IEEE Photonics Technology Letters, vol. 8, No. 10, pp. 1331–1333.

F. Bilodeau, D. C. Johnson, S. Thériault, B. Malo, J. Albert, and K.O. Hill, "An All–Fiber Dense–Wavelength–Division Multiplexer–Division Multiplexer/Demultiplexer Using Photoimprinted Bragg Gratings", Apr. 1995, IEEE Photonics Technology Letters, vol. 7, No. 4, pp. 388–390.

M.S. O'Sullivan and D.W. Gransden, "New Design Concept for a Narrowband Wavelength–Selective Optical Tap and Combiner", Jun. 18, 1987, Electronics Letters, vol. 23, No. 13, pp. 668–669.

X.D. Huang and M.A. Jack, "Narrowband GaInAsP/InP Waveguide Grating–Folded Directional Coupler Multiplexer/Demultiplexer", Feb. 4, 1988, Electronics Letters, vol. 24, No. 3, pp.150–151.

*Primary Examiner*—Hung N. Ngo
*Attorney, Agent, or Firm*—Watov & Kipnes, P.C.

[57] ABSTRACT

Optical signal devices and methods of forming the same in which a substrate is provided with a pair of spaced apart cladding layers made of a material having a first refractive index, having sandwiched therebetween a core layer including a pair of waveguides having a second refractive index greater than the first refractive index and a grating region including a filter extending through the core and cladding layers for causing a single wavelength of light of a multiple wavelength light source to be segregated therefrom.

27 Claims, 6 Drawing Sheets

WAVELENGTH DIVISION MULTIPLEXER/DEMULTIPLEXER OPTICAL DEVICE

FIELD OF THE INVENTION

The present invention is generally directed to integrated wavelength division multiplexer/demultiplexer optical devices in which light of a specific wavelength (or specific wavelengths) can be added or dropped in an efficient manner. The device can be fabricated with close tolerances, generally more compact construction, and with less loss of light than typical devices.

BACKGROUND OF THE INVENTION

Devices for adding and dropping wavelength coded signals (light of a specific wavelength or wavelengths) are known in the art. Such devices employ optical fibers which are utilized predominantly in telecommunication systems in addition to local area networks, computer networks and the like. The optical fibers are capable of carrying large amounts of information and it is the purpose of devices of the present invention to extract a selected amount of information from the fiber by segregating the information carried on different wavelength channels.

Devices of this type are comprised of a variety of components which together provide the desired segregation of wavelength coded signals. Integrated optical couplers and especially directional couplers have been developed to accomplish evanescent directional coupling. Optical signals are coupled from one planar waveguide to another. The signals in the second planar waveguide propagate in the same direction in which the signals travel in the first planar waveguide.

Diffraction gratings (e.g. Bragg gratings) are used to isolate a narrow band of wavelengths. Such grating reflectors have made it possible to construct a device for use in adding or dropping a light signal at a predetermined centered wavelength to or from a fiber optic transmission system without disturbing other signals at other wavelengths.

Bragg grating systems for use in optical coupler devices are disclosed in Elias Snitzer, U.S. Pat. No. 5,574,807, incorporated herein by reference. The '807 Patent discloses a device for use in adding or dropping light signals at predetermined center wavelengths to or from a wavelength division multiplex fiber optic transmission system which carries signals at other wavelengths. A twin core fiber which is comprised of two, substantially identical, single mode fibers which form a coupling region are fabricated to provide substantially complete evanescent field coupling of light from one core to the other in a predetermined wavelength band. The twin core fiber also includes a Bragg grating system which is substantially perpendicular to the axis of the twin core fiber.

Charles H. Henry et al., U.S. Pat. No. 5,636,309 discloses Mach-Zehnder (MZ) type devices which employ two planar optical waveguides (e.g. fibers), with each of the waveguides comprising a core and a cladding. The waveguides include opposed arms that extend between two coupling regions. In the coupling regions the cores of the respective waveguides are disposed relatively close to each other to facilitate evanescent field coupling. The spaced apart arms are disposed such that the maximum spacing between the arms is small enough to enable simultaneous formation of the refractive index Bragg gratings by simultaneous exposure of both cores to refractive index-changing radiation. U.S. Pat. No. 5,636,309 is incorporated herein by reference.

The devices disclosed in the prior art such as described above suffer from a number of disadvantages. One such disadvantage is that they are difficult to fabricate. A second disadvantage is that it is difficult to align Bragg gratings across the arms of the optical waveguides in the grating region. A third disadvantage is that there is a significant loss of light owing to the length of the waveguides.

It would therefore be a significant advance in the art of optical waveguide devices to provide such devices with greater control over the passage of light through the device and control over the adding and/or dropping of light signals at a predetermined wavelength or wavelengths.

SUMMARY OF THE INVENTION

The present invention is generally to optical signal devices which provide for the more efficient treatment of light and a reduction in loss of light to provide a more efficient device for the adding and dropping of light signals. In particular, the optical signal device of the present invention comprises:

a) a substrate;

b) a pair of spaced apart cladding layers comprised of a material having a first refractive index value;

c) a core layer including a pair of opposed waveguides positioned between the pair of cladding layers having a second refractive index value greater than the first refractive index value such that the difference between the second and first refractive index values enables a multiple wavelength light source to pass through the device in a single mode; and d) a grating region comprising a filter means extending through the core and cladding layers for causing a single wavelength of light of said multiple wavelength light source to be segregated therefrom.

Methods of fabricating the optical signal devices of the present invention are also disclosed.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

The present invention is directed to an optical signal device in which opposed waveguides comprise a core layer and upper and lower cladding layers in which the respective layers are preferably made of a photosensitive material which enables the application of a refractive grating system by photolithography. The optical signal device provides a simpler means of fabrication with less loss of light than systems conventionally employed in the art.

In general, the optical signal device comprises a substrate having thereon a pair of spaced apart cladding layers having a core layer therebetween with the core layer including a pair of opposed waveguides. The waveguides are preferably applied to the core layer by direct photolithography as hereinafter described. The optical signal device also includes a filter means, preferably in the form of a Bragg reflection grating system which extends through the core and cladding layers to enable a single wavelength channel (referred to as wavelength hereinafter) of light to be segregated from an input light source.

Figure 1:
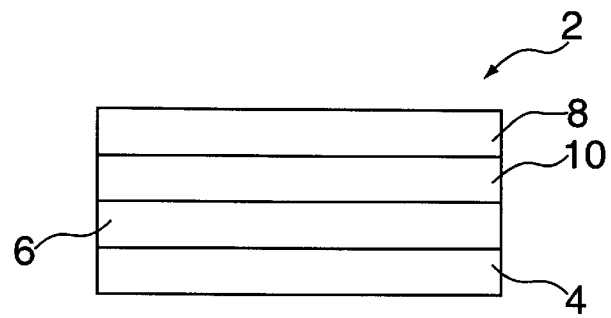
FIG. 1 is a side elevational view of an optical signal device of the present invention showing the relative positioning of the substrate, cladding layers and core layers.

Referring to FIG. 1, there are shown the principal layers which comprise the optical signal device of the present invention. In particular, the optical signal device 2 includes a substrate 4 having thereon an under cladding layer 6 and an over cladding layer 8. Sandwiched between the cladding layers 6 and 8 is a core layer 10 in which waveguides (not shown) are imprinted as described hereinafter.

The arrangements of the waveguides which are imprinted in the core layer 10 are devised to provide an optical signal device in which a single wavelength of light from a multiple wavelength light source is segregated and discharged from the optical signal device. A light signal of the same wavelength may be added to the optical signal device as described hereinafter.

The substrates employed for fabrication of the optical signal device of the present invention can be selected from a variety of materials including glass, silicon, plastics (e.g. polyurethane and polycarbonate) and the like. The under cladding layer 6 and the over cladding layer 8 are preferably made from photosensitive materials, preferably polymeric materials which have a lower refractive index value than the core layer 10.

The core layer 10, having a higher refractive index than either of the cladding layers, is also made of a photosensitive material. Such photosensitive materials include ethoxylated bisphenol diacrylate and chlorofluorodiacrylate and are of the type of materials which can be treated with a source of energy to differentiate one region of the material (e.g. where the waveguides are imprinted) from another region of the material through the use of, for example, a photomask and the like.

The selection of suitable materials for the cladding layers 6, 8 and the core layer 10 is performed in a manner such that the difference in the refractive index of the core layer 10 and the refractive indexes for the cladding layers 6, 8 is appropriate to provide an optical signal device which transmits light in a single mode (i.e. the fundamental mode which has an essentially Gaussian profile). The selection of a suitable difference in refractive indexes depends in part on the dimensions of the waveguides employed in the core layer. For example, in a polymer of refractive index around 1.5, for waveguides having a height and width of about 6 microns, the difference in refractive indexes between the core and the cladding layers should be no more than about 0.0078. As the dimensions of the waveguides increase, the difference in refractive indexes decrease. For example, a 7 micron waveguide (height and width) should employ a difference in refractive indexes of no more than about 0.0057. For 8 micron waveguides, the difference in refractive indexes should be no more than about 0.0044.

The selection of a suitable difference in refractive indexes for a given pair of waveguides, will also depend, in part, on whether the waveguides have bends therein. If bends are employed in the waveguides, then the difference in refractive indexes within the given range should be at the higher end thereof.

Fabrication of the optical signal devices of the present invention is conducted by forming the under cladding layer on a substrate such as glass. The cladding layer is preferably made of a polymeric material which upon treatment with energy (e.g. UV light) becomes cured (i.e. is photosensitive).

The core layer is then applied and the waveguides are imprinted thereon. The waveguides may be applied as a positive photoresist or a negative photoresist. With a positive photoresist, a mask is placed over the core material and UV light is applied solely to the region where the waveguides are not to be imprinted. With negative photoresist, the mask is clear in only the regions where the waveguides are to be imprinted and the remainder of the photosensitive material is blocked from exposure to UV radiation.

In accordance with one aspect of the present invention, the grating is applied across both the cladding layers as well as the core layer. It is known that as much as 25% of the light which passes through the waveguides of known optical signal devices propagates in the cladding layers. The present invention provides for the reflection of light in the cladding areas and therefore a significant reduction in the loss of light to levels well below 25%.

The employment of appropriate photosensitive materials for both the core and cladding regions enables the production of optical signal devices of a variety of configurations for particular applications as discussed in detail hereinafter.

Figure 2:
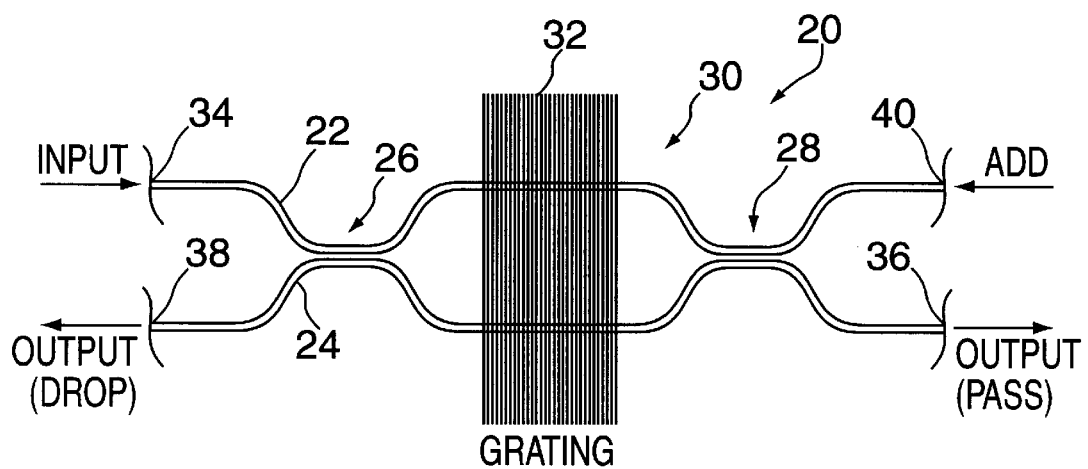
FIG. 2 is a schematic view of a first embodiment of the invention with waveguides positioned to enable evanescent coupling in a 3-dB coupler region of the device.

Referring to FIG. 2, there is shown a single channel add/drop optical signal in the form of a Mach-Zehnder device 20 which is formed on a substrate (see FIG. 1 for the relative position of the substrate). The device 20 shown in FIG. 2 in which evanescent coupling occurs in the coupling regions has two substantially identical planar waveguides 22, 24 which are aligned with each other in two 3-dB coupling regions 26, 28 in the form of directional couplers. Between the coupling regions 26 and 28 is a grating region 30 comprised of a grating system 32 (e.g. Bragg gratings).

The waveguides 22 and 24 are shown in the embodiment of FIG. 2 spaced apart from each other a sufficient distance so that evanescent coupling does not occur in the grating region 30.

Light of multiple wavelengths enter the device 20 through an input port 34. Wavelengths that are not resonant with grating system 32 propagate through the grating to an output port 36 for further treatment (e.g. further demultiplexing). One preselected wavelength of light that is resonant with the grating system 32 is reflected in the grating region 30 and exits the device 20 through a drop port 38. Light of a predetermined wavelength may be added to the device 20 through a port 40.

Figure 3:
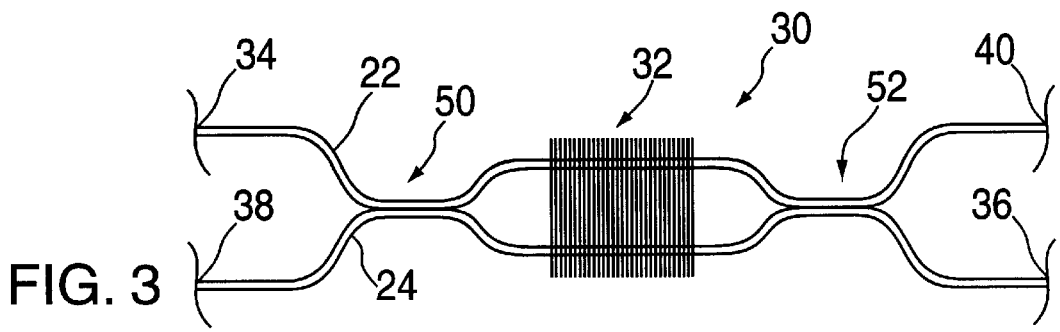
FIG. 3 is a schematic view of an embodiment of the invention similar to FIG. 2 with the waveguides in the coupling region being adjacent to each other.

An improvement of the device shown in FIG. 2 provides for the waveguides in the coupling regions to be adjacent to each other so that there is a zero gap between the waveguides. Referring to FIG. 3, there is provided coupling regions 50 and 52 in which the waveguides 22 and 24 are adjacent to each other (i.e. there is no space between the waveguides). In this embodiment of the present invention, the zero gap configuration between the waveguides in the coupling regions 50 and 52 makes it possible to shorten the device and provides the added advantage of easier fabrication.

In a further embodiment of the present invention, the 3-dB coupler regions are in the form of 3-dB MMI couplers of identical refractive index to the core material. The MMI couplers are preferably made of a polymeric material identical to the core material. The 3-dB MMI coupler provides the same functionality as a 3-dB evanescent coupler, which is to accurately split the light so that each of the two waveguide arms, as it leaves the coupler region, receives approximately 50% of the light. An MMI coupler eliminates the need for evanescent coupling, which is an interferometric process and thus very sensitive to fabrication errors and environmental changes. Furthermore, MMI couplers are more tolerant, when compared to evanescent couplers, of variations in wavelength and polarization.

Figure 4:
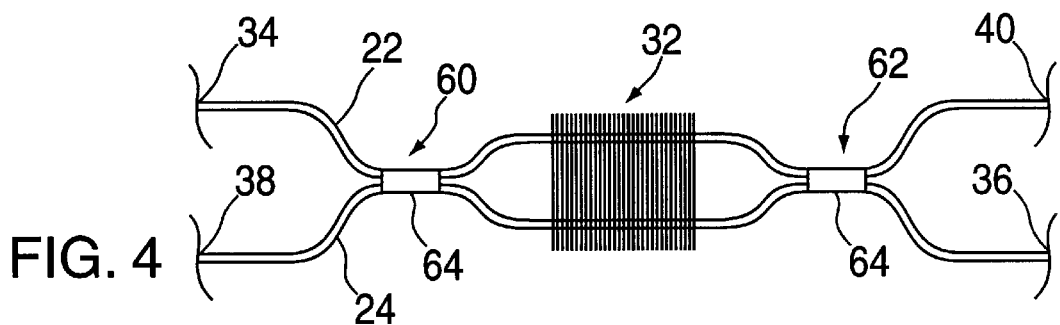
FIG. 4 is a schematic view of an embodiment similar to FIG. 2 employing a polymeric slab in the coupler region to provide for the support of multiple modes laterally, thereby forming a 3-dB multimode interference (MMI) coupler.

Referring to FIG. 4, there is shown an embodiment of an optical signal device of the present invention having two coupler regions 60 and 62 each comprising a 3-dB MMI coupler 64 having a uniform rectangular cross-section.

Figure 5:
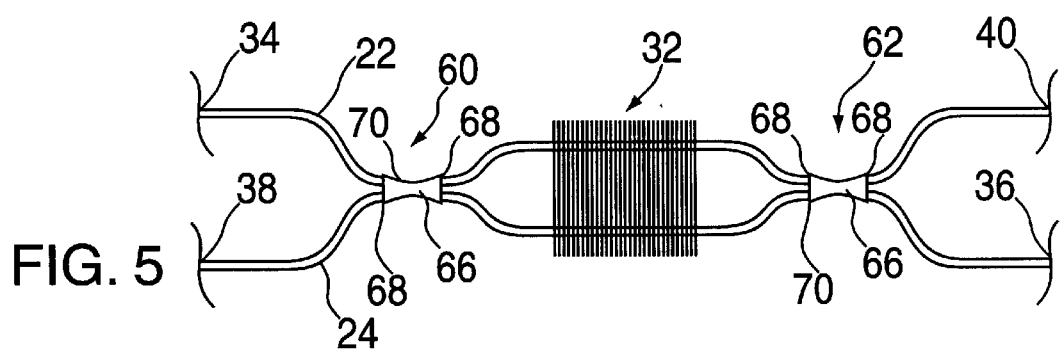
FIG. 5 is a schematic view of an embodiment of the invention similar to FIG. 4 with the 3-dB MMI coupler having a tapered shape.

An embodiment related to that shown in FIG. 4 and which provides the advantage of being fabricated over shorter distances is shown in FIG. 5. In this embodiment, there is provided a 3-dB MMI coupler 66 having an inwardly tapered body 70. In a preferred embodiment the edges are parabolically shaped. The tapered configuration of the MMI coupler 66 shown in FIG. 5 enables the coupler to be less wide which reduces the length of the coupler and thus the overall length of the optical signal device. In particular, the 3-dB MMI coupler has opposed ends which have a greater cross-sectional area than the tapered body especially in the central portion of the tapered body.

As previously described, the waveguides in the grating region are typically spaced apart from each other a sufficient distance so that coupling does not occur. The employment of MMI couplers in the coupling region, as previously indicated, eliminates evanescent coupling. The MMI couplers enable a 50—50 split of the light over a wide range of wavelengths with less polarization sensitivity. Applicants have determined that because evanescent coupling does not occur between the waveguides entering and exiting couplers when the MMI couplers are employed in the coupling region, then the distance between the waveguides in the grating region need not be increased to an extent necessary to prevent evanescent coupling. As a consequence, the distance between the waveguides may be maintained at or about the same value in both the region immediately outside the couplers and the grating region.

Figure 6:
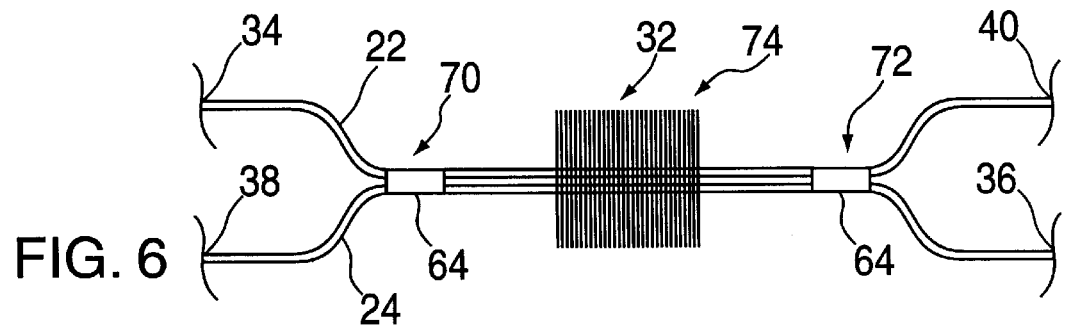
FIG. 6 is a schematic view of an embodiment of the invention similar to FIG. 4 except that the waveguides are spaced apart approximately the same distance from each other in both the region immediately outside the couplers and the grating region.

Referring to FIG. 6, there is shown an optical signal device in which an MMI coupler 64 is provided in coupling regions 70 and 72. The distance between the waveguides immediately outside the coupling regions 70 and 72 is about the same as the distance between the waveguides in the grating region 74. This embodiment of the invention is advantageous because there are no bends in the arms and so the waveguides have a shorter length. Reduction in length through the elimination of bends and the elimination of bend-induced radiation loss result in less loss of light during operation of the device.

Figure 7:
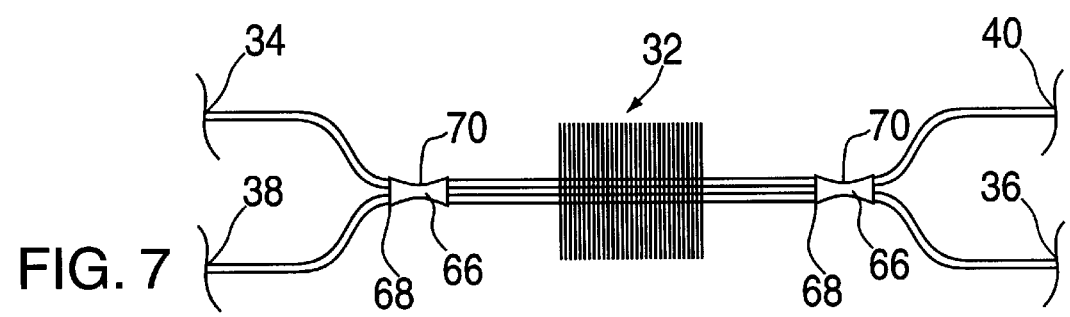
FIG. 7 is a schematic view of another embodiment of the invention similar to FIG. 6 in which the MMI coupler has a tapered shape.

An improved version of the embodiment shown in FIG. 6 is shown in FIG. 7 wherein the 3-dB MMI couplers are tapered. As previously discussed in connection with a comparison of the embodiments of FIGS. 4 and 5, the tapered shape enables the length of the MMI couplers to be reduced while accomplishing the same objects (i.e. 50/50 coupling by multimode interference).

In a further embodiment of the invention, 100% couplers (evanescent or MMI) are used and the gratings are placed in the middle of the couplers. These embodiments of the invention are shown in FIGS. 8–11.

Figure 8:
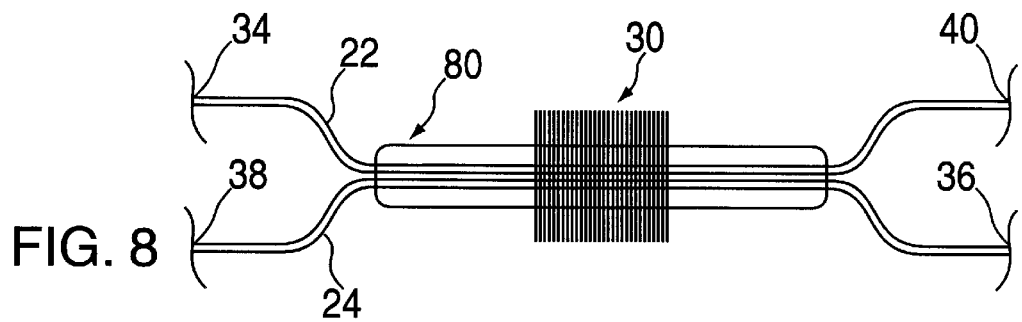
FIG. 8 is an embodiment of the invention similar to FIG. 2 absent the spaced apart arms, resulting in an uninterrupted 100% directional coupler.

Referring first to FIG. 8, the waveguides 22 and 24 are maintained in close proximity to each other at the same distance in the coupler region 80 and the grating region 30 (which overlaps with the central section of the coupler). Evanescent coupling takes place in this embodiment of the invention. The length of the waveguides is reduced because all bends are eliminated from the grating region. Because the waveguides are not separated to stop evanescent coupling at the 3-dB point, the width of the gratings in the grating region 30 may be reduced to less than that which takes place typically for the devices shown and described in connection with FIGS. 2–7.

Figure 9:
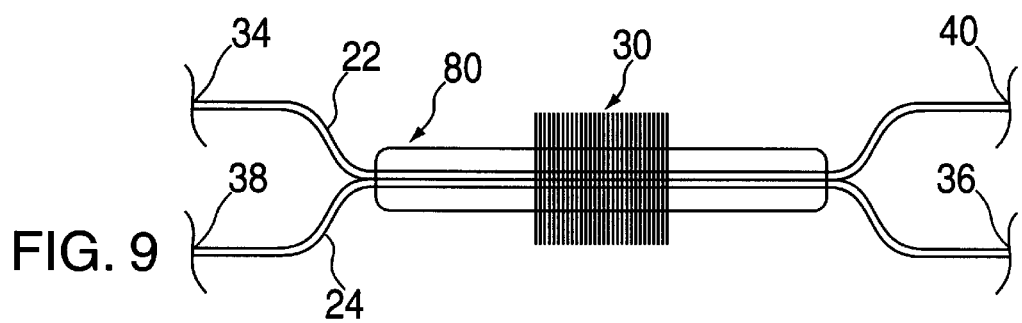
FIG. 9 is an embodiment of the invention similar to FIG. 8 in which the waveguides are adjacent each other.

Referring to FIG. 9, the waveguides 22 and 24 in coupler region 80 and grating region 30 are placed adjacent to each other so that there is no gap between them. As previously discussed in connection with the embodiments of FIGS. 2 and 3, this embodiment of the invention provides easier fabrication and enables the dimensions of the optical signal device to be reduced over conventional devices.

Figure 10:
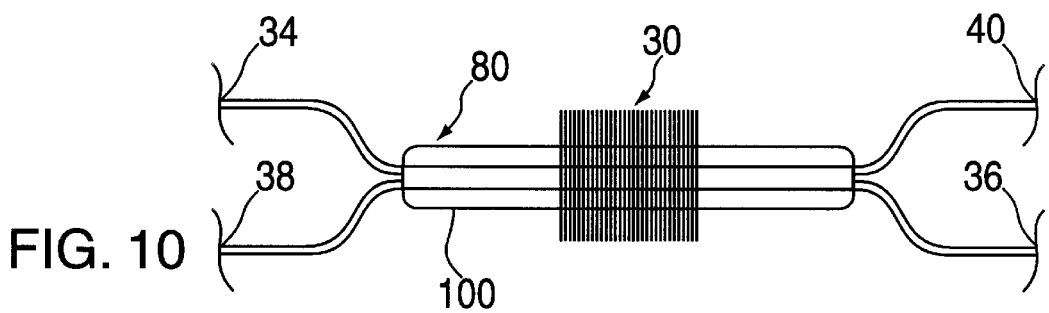
FIG. 10 is an embodiment of the invention similar to FIG. 8 in which the 100% directional coupler is replaced by a 100% MMI coupler.

In the embodiment described above in connection with FIG. 8, the evanescent coupler may be replaced with a 100% MMI coupler as shown in FIG. 10. The grating region 30 overlaps with the central section of the coupler region 80.

Figure 11:
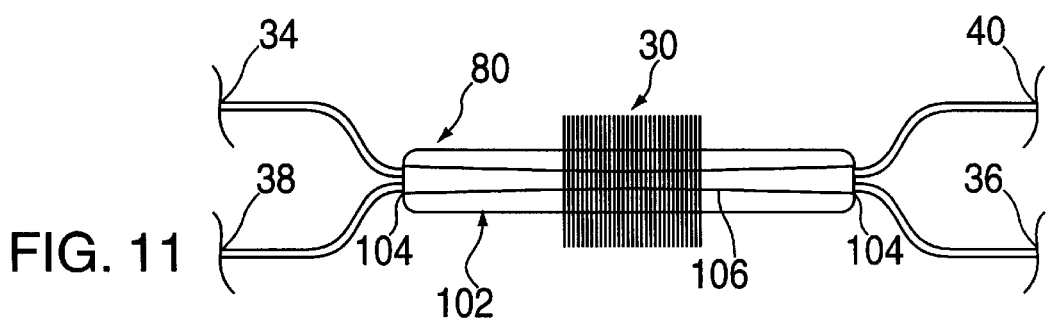
FIG. 11 is an embodiment of the invention similar to FIG. 10 in which the 100% MMI coupler has a tapered shape.

An improved version of the optical signal device shown in FIG. 10 is shown in FIG. 11. An inwardly tapered 100% MMI coupler is utilized. The tapered MMI coupler 102 reduces the dimensions of the optical signal device as previously described in connection with the embodiments of FIGS. 5 and 7.

Figure 12:
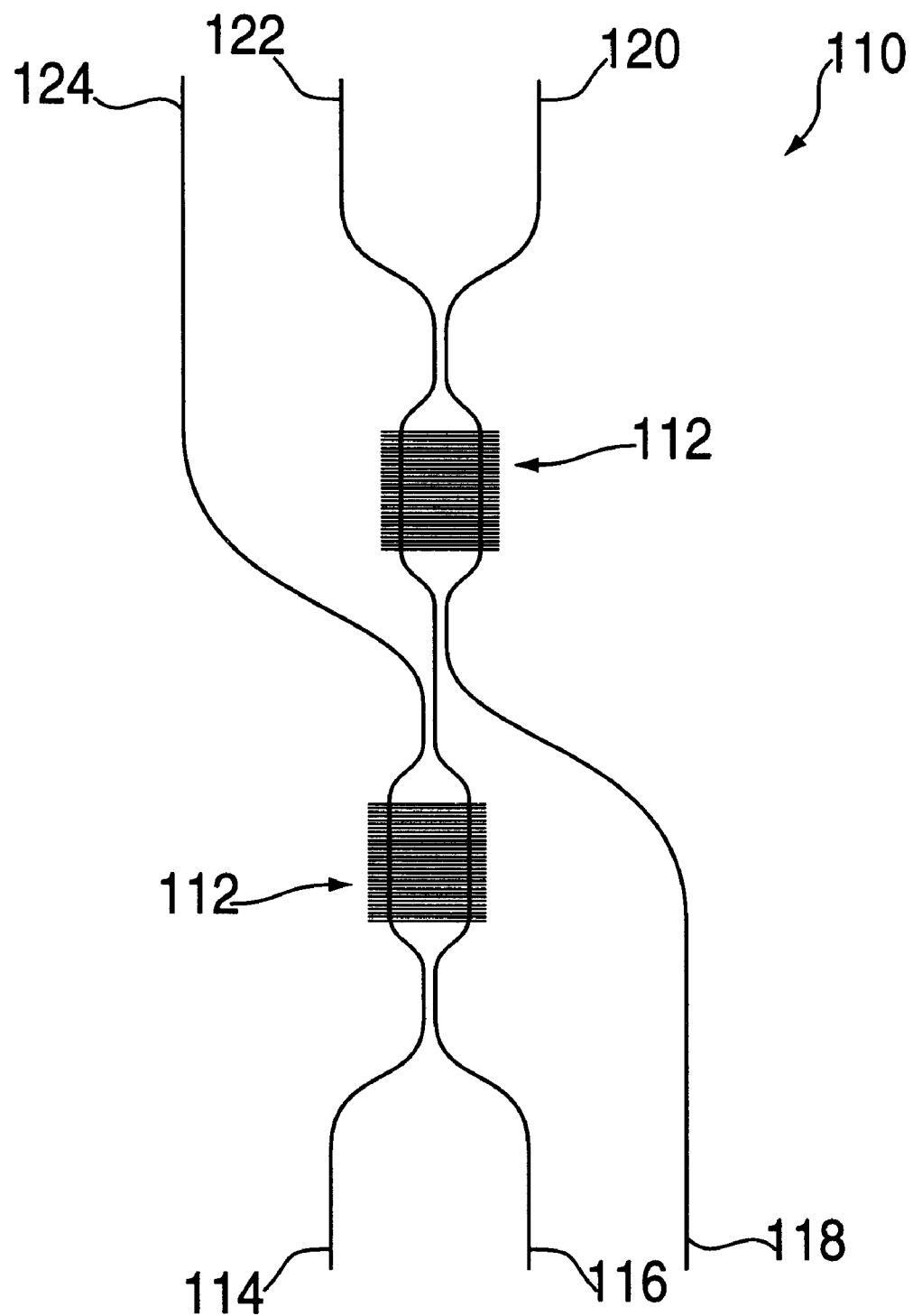
FIG. 12 is a schematic view of an embodiment of the invention employing a 2-channel add/drop configurations.

The present invention may be fabricated as a multichannel add/drop device. Referring to FIG. 12, there is shown a 2-channel add/drop device 110 wherein the disclosed add/drop filters 112 (two are shown) are preferably Mach-Zehnder type devices in accordance with the present invention. As specifically shown in FIG. 12, the add/drop optical signal devices have the configuration previously described in connection with FIG. 3.

By way of operation, a light source having multiple wavelengths ($\lambda_1, \lambda_2, \lambda_3 \ldots \lambda_N$) enters the port 114 while the signal of wavelength ($\lambda_1$) exits out of port 116, and the signal of wavelength $\lambda_2$ exits out of port 118. The output of port 120 includes all wavelengths except the predetermined wavelengths ($\lambda_1$ and $\lambda_2$) which exit out of ports 116 and 118, respectively. Optionally, light of a predetermined wavelength can be added to the system through ports 122 ($\lambda_2$) and 124 ($\lambda_1$) and will exit the device through port 120. The dual optical signal device of FIG. 12 can substantially reduce the strength of the drop channel at the pass port, sending a substantial amount of light in said channel to the drop port, and can substantially improve isolation between the drop signals.

Figure 13:
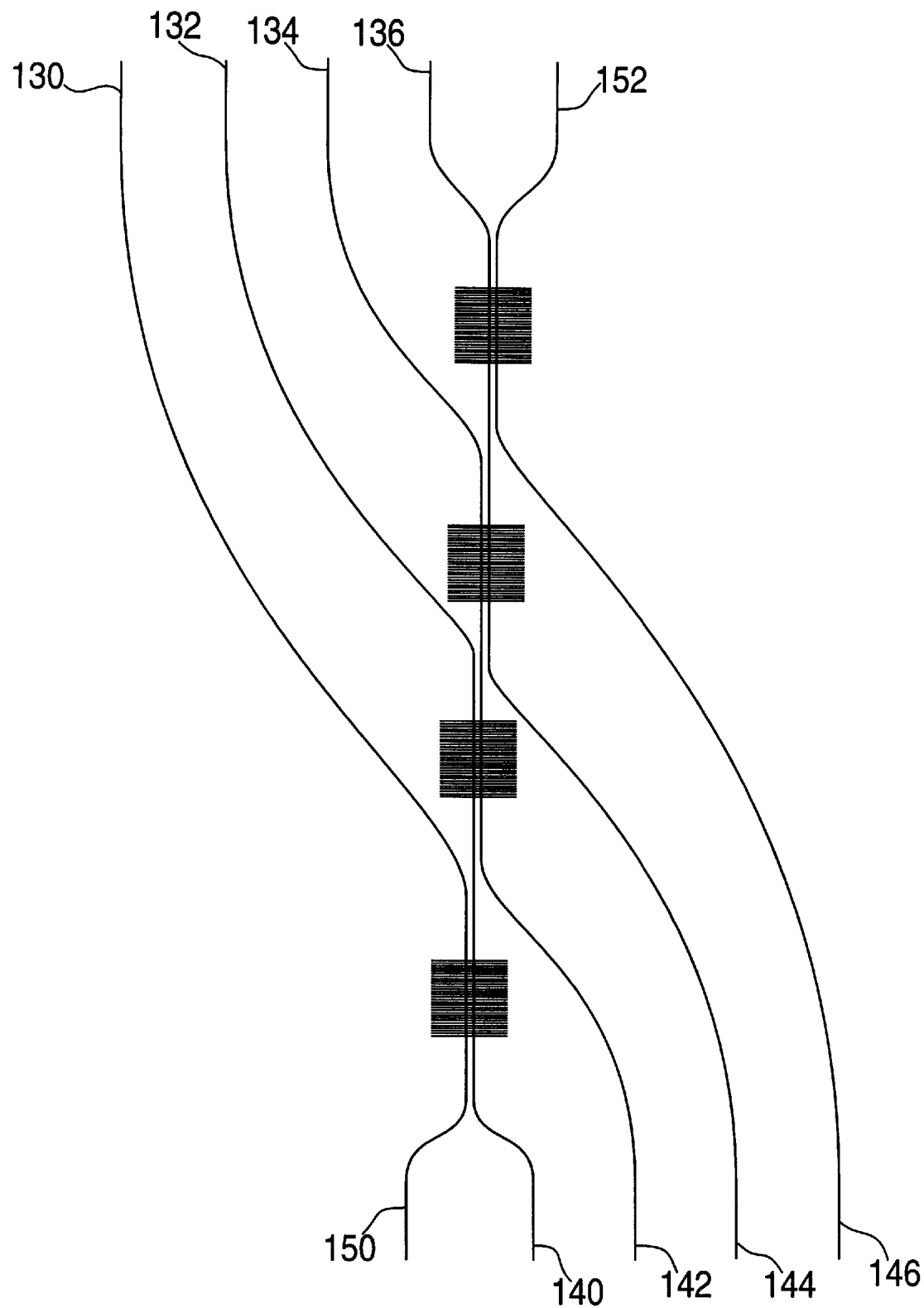
FIG. 13 is a schematic view of an embodiment of the invention employing a 4-channel add/drop configuration.

Employing the same principles as disclosed above in connection with the embodiment of FIG. 12, a 4-channel add/drop device may be constructed in accordance with the present invention as shown in FIG. 13. As specifically shown in FIG. 13, the add/drop optical signal devices have the configuration previously described in connection with FIG. 8. In this case, four ports (130–136) may be used to add signals while four ports (140–146) may be used to drop signals. Port 150 is the main input port and port 152 is the main output (pass) port.

All the devices shown in FIGS. 2–11 can be cascaded to form multi-channel add/drop devices. The preferred embodiment uses Mach-Zehnder based add/drop elements as shown in FIGS. 2–7 since in these devices (as opposed to devices based on 100% directional couplers as shown in FIGS. 8–11) the entirety of the gratings reflects at the 3-dB coupling level, resulting in more of the light at the drop channel exiting the drop port.

Figure 14:
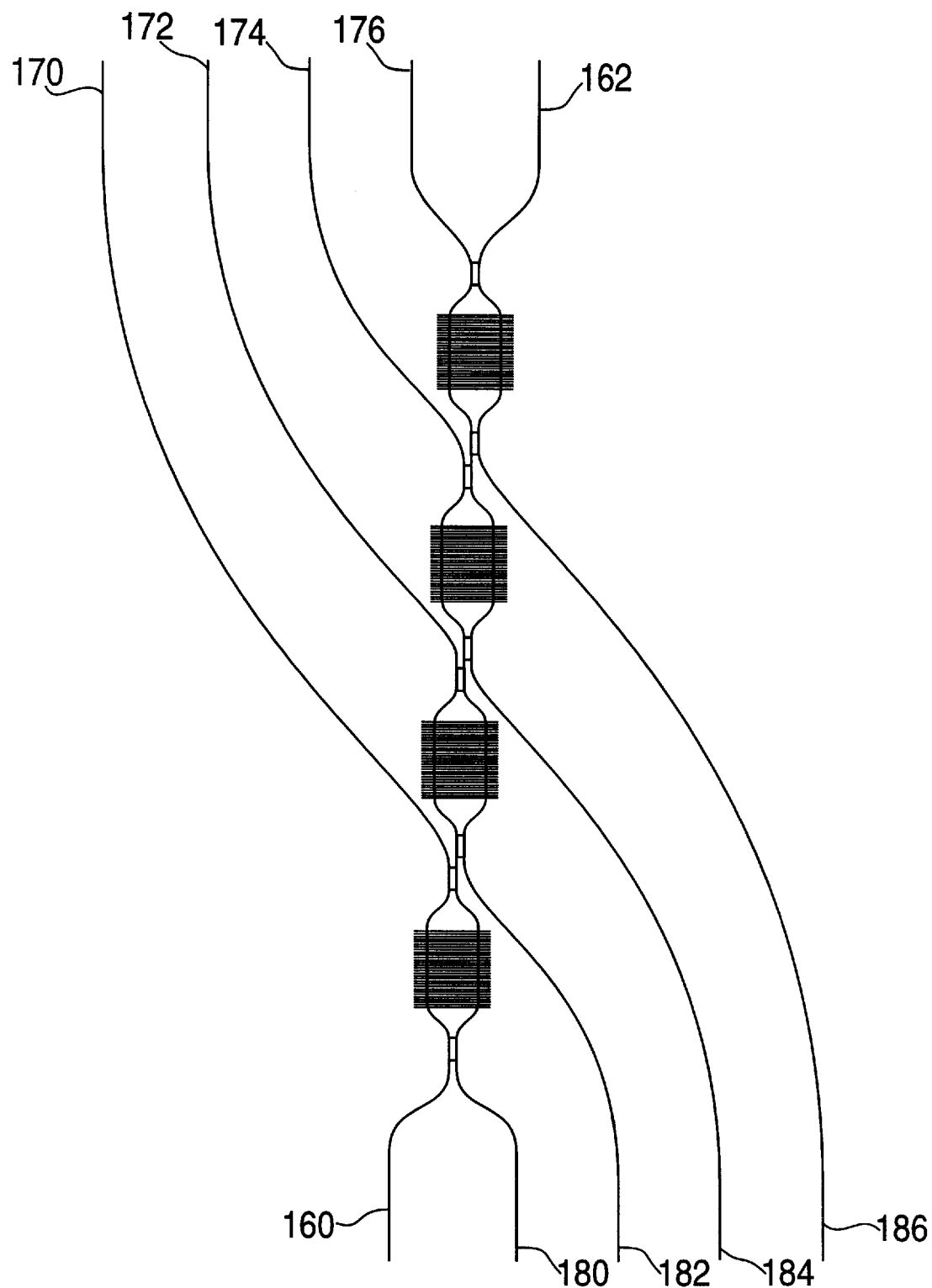
FIG. 14 is a schematic view of another embodiment of the invention employing a 4-channel add/drop configuration.

Employing the same principles as disclosed above in connection with the embodiment of FIGS. 12 and 13, a 4-channel add/drop device may be constructed in accordance with the present invention using a Mach-Zehnder based add/drop element where the 3-dB couplers are MMI couplers of the configuration previously described in connection with FIG. 4, and said 4-channel device is shown in FIG. 14. In this case, the main input port is port 160. The main output (pass) port is 162, the add ports are ports 170–176 and the drop ports are ports 180–186.

EXAMPLE 1

A silicon wafer was used as a substrate. A negative-tone liquid photomonomer (from a mixture of 20.0 g ethoxylated bisphenol diacrylate, 10.0 g tripropylene glycol diacrylate, 0.6 g photoinitiator Irgacure 651, and 0.09 g antioxidant Irganox 1010) was spin-coated so as to form a layer that was 10 µm thick and was subsequently uniformly UV-cured under a mercury lamp (Hg i-line, wavelength=365 nm) forming a solid thin film of refractive index 1.4895 as an undercladding layer. A negative-tone liquid photomonomer (from a mixture of 20.0 g ethoxylated bisphenol diacrylate, 8.0 g tripropylene glycol diacrylate, 2.0 g 1,6-hexanediol diacrylate, 0.6 g photoinitiator Irgacure 651, and 0.09 g antioxidant Irganox 1010) was spin-coated onto the undercladding layer so as to form a layer that was 6 µm thick, was placed in contact with a mask where the waveguiding circuit (a 4-channel add/drop device where each of the four add/drop elements in the cascade was a Mach-Zehnder interferometer with the 3-dB couplers being rectangular MMI type) was clear (the width of the waveguides in the mask was 6 µm), and that layer was subsequently selectively UV-cured through the mask under the mercury lamp, solidifying the core waveguiding circuit which had a fully cured refractive index of 1.4970. The mask was removed and the unexposed sections were developed away using methanol. The same photomonomer used for the undercladding was spin-coated onto the core structures so as to form a conformal layer that was 10 µm thick; that layer was subsequently blanket UV-exposed under a mercury lamp forming a solid conformal film of refractive Index 1.4895 as an overcladding layer. A phase mask with four gratings was used to print (using an Argon ion laser operating at 363.8 nm) a grating across the spaced-apart arms in each of the four Mach-Zehnders. The same was finally subjected to a final UV cure under the mercury lamp (60 sec.) and a final thermal cure (90° C. for 1 h). The device was tested by cleaving the silicon wafer across the ends of the device, and light from an EDFA (Erbium Doped Fiber Amplifier) source was launched into the input port while the four drop ports were monitored with an OSA (Optical Spectrum Analyzer). The test revealed that all four desired drop channels exited the proper drop ports.

What is claimed is:

1. An optical signal device comprising:

a) a substrate;

b) a pair of spaced apart cladding layers comprised of a material having a first refractive index value;

c) a core layer comprising at least one waveguide positioned between a pair of cladding layers, having a second refractive index value greater than the first refractive index value such that the difference between the second and the first refractive index values enables a multiple wavelength light source to pass through the device in a single mode; and d) a Bragg grating region in each of the cladding layers and core layer which are all comprised of photosensitive materials, forming a filter means for causing a single wavelength of light of said multiple wavelength light source to be segregated therefrom.

2. The optical signal device of claim 1 wherein the waveguides are applied to the core region by direct photolithography.

3. A multichannel add/drop optical signal device comprising a cascade of a plurality of Mach-Zehnder optical signal devices of claim 1.

4. A Mach-Zehnder form of an optical signal device comprising:

a) a substrate;

b) a pair of spaced apart cladding layers comprised of a material having a first refractive index value;

c) a core layer including a pair of opposed waveguides positioned between a pair of cladding layers, having a second refractive index value greater than the first refractive index value such that the difference between the second and the first refractive index values enables a multiple wavelength light source to pass through the device in a single mode, and waveguides being sufficiently close to each other in two essentially—3-dB directional coupling regions; and d) a Bragg grating region in each of the cladding layers and core layer which are all comprised of photosensitive materials, across spaced apart arms at or about the 3-dB coupling level, forming a filter means for causing a single wavelength of light of said multiple wavelength light source to be segregated therefrom.

5. A multichannel add/drop optical signal device comprising a cascade of a plurality of Mach-Zehnder optical signal devices of claim 4.

6. The optical signal device of claim 5 wherein the waveguides are applied to the core region by direct photolithography.

7. A Mach-Zehnder form of an optical signal device comprising:

a) a substrate;

b) a pair of spaced apart cladding layers comprised of a material having a first refractive index value;

c) a core layer including a pair of opposed waveguides positioned between a pair of cladding layers, having a second refractive index value greater than the first refractive index value such that the difference between the second and the first refractive index values enables a multiple wavelength light source to pass through the device in a single mode, and waveguides being adjacent to each other in two essentially—3-dB directional coupling regions; and d) a Bragg grating region across spaced apart arms at or about the 3-dB coupling level, forming a filter means for causing a single wavelength of light of said multiple wavelength light source to be segregated therefrom.

8. The optical signal device of claim 7 wherein each of the cladding layers and core layer is comprised of a photosensitive material, allowing the grating region to be present in all three layers.

9. The optical signal device of claim 7 wherein the waveguides are applied to the core region by direct photolithography.

10. A multichannel add/drop optical signal device comprising a cascade of a plurality of Mach-Zehnder optical signal devices of claim 7.

11. A Mach-Zehnder form of an optical signal device comprising:

a) a substrate;

b) a pair of spaced apart cladding layers comprised of a material having a first refractive index value;

c) a core layer including in series two 2×2 essentially—3-dB MMI couplers positioned between the pair of cladding layers having a second refractive index value greater than the first refractive index value such that the difference between the second and the first refractive index values enables a multiple wavelength light source to pass through the non-MMI part of the device in a single mode; and d) a Bragg grating region forming a filter means for causing a single wavelength of light of said multiple wavelength light source to be segregated therefrom.

12. The optical signal light device of claim 11 wherein each of the cladding layers and core layer is comprised of a photosensitive material, allowing the grating region to be present in all three layers.

13. The optical signal device of claim 11 wherein the waveguides are applied to the core region by direct photolithography.

14. The optical signal device of claim 11 wherein the MMI couplers have a uniform rectangular cross-section.

15. The optical signal device of claim 11 wherein the MMI couplers are tapered, with the opposed ends having a greater cross-sectional area than the central body section.

16. The optical signal device of claim 11 wherein the waveguides in the central region between the MMI couplers are spaced apart a further distance from each other than he waveguides are spaced apart from each other immediately outside the two MMI couplers.

17. The optical signal device of claim 11 wherein the waveguides are spaced apart approximately the same distance in both the central region between the MMI couplers and the region immediately outside the two MMI couplers.

18. A multichannel add/drop optical signal device comprising a cascade of a plurality of Mach-Zehnder optical signal devices of claim 11.

19. An optical signal device comprising:

a) a substrate;

b) a pair of spaced apart cladding layers comprised of a material having a first refractive index value;

c) a core layer including a pair of opposed waveguides positioned between the pair of cladding layers having second refractive index value greater than the first refractive index value such that the difference between the second and first refractive index values enables a multiple wavelength light source to pas through the device in a single mode;

d) a coupling region causing essentially 100% coupling of light between the said two opposed waveguides; and e) a Bragg grating region overlapping with a central section of the coupling region at or about the 3-dB coupling level, said grating region forming a filter means for causing a single wavelength of light of said multiple wavelength light source to be segregated therefrom.

20. The optical signal device of claim 19 wherein each of the cladding layers and core layer is comprised of a photosensitive material, allowing the grating region to be present in all three layers.

21. The optical signal device of claim 19 wherein the waveguides are applied to the core region by direct photolithography.

22. The optical signal device of claim 19 wherein the coupling region comprises an essentially—100% directional coupler.

23. The optical signal device of claim 22 wherein the waveguides in the coupling region are adjacent to each other.

24. The optical signal device of claim 19 wherein the coupling region comprises an essentially—100% MMI coupler.

25. The optical signal device of claim 24 wherein the MMI coupler has a uniform rectangular cross-section.

26. The optical signal device of claim 24 wherein the MMI coupler is tapered, with the opposed ends having a greater cross-sectional area than the central body section.

27. A multichannel add/drop optical signal device comprising a cascade of a plurality of Mach-Zehnder optical signal devices of claim 19.

* * * * *